US012751439B1

(12) United States Patent
Vanderpan

(10) Patent No.: US 12,751,439 B1
(45) Date of Patent: Oct. 6, 2026

(54) FISHING BOB AND METHOD FOR USE

(71) Applicant: Dave Vanderpan, Elk Grove, CA (US)

(72) Inventor: Dave Vanderpan, Elk Grove, CA (US)

( * ) Notice: Subject to any disclaimer, the term of this patent is extended or adjusted under 35 U.S.C. 154(b) by 0 days.

(21) Appl. No.: 19/085,060

(22) Filed: Mar. 20, 2025

(51) Int. Cl.
*A01K 93/00* (2006.01)

(52) U.S. Cl.
CPC .................................... *A01K 93/00* (2013.01)

(58) Field of Classification Search
CPC ......... A01K 93/00; A01K 93/02; A01K 95/00
USPC .................................................... 43/4.5, 43.1
See application file for complete search history.

(56) References Cited

U.S. PATENT DOCUMENTS 2,754,616 A * 7/1956 Law ...................... A01K 93/00 43/44.91
3,043,043 A * 7/1962 Parry ..................... A01K 95/00 43/44.87
3,107,451 A * 10/1963 Sitzler .................... A01K 93/00 43/44.87
3,197,914 A 8/1965 Beverly
4,426,804 A * 1/1984 Hutson .................. A01K 93/00 43/44.91
4,561,205 A * 12/1985 Kessler .................. A01K 91/20 43/4.5
4,563,831 A * 1/1986 Gibney .................. A01K 93/00 43/44.87
4,616,441 A * 10/1986 Dmytriw ................ A01K 93/00 43/44.91
4,817,326 A * 4/1989 Benjestorf ............. A01K 93/00 43/44.9
4,893,433 A * 1/1990 Scheffler ................ A01K 93/00 43/44.9
5,251,396 A * 10/1993 Haigh .................... A01K 91/18 43/44.84
5,575,104 A * 11/1996 Wilding ................. A01K 91/06 43/42.31
6,931,786 B1 * 8/2005 Bennett .................. A01K 93/00 43/44.89
D671,189 S 11/2012 Sanders
8,656,634 B2 * 2/2014 Farley .................... A01K 95/00 43/44.92
9,591,841 B2 * 3/2017 Schoenike ............. A01K 93/02
12,408,645 B2 * 9/2025 Knickrehm .......... A01K 87/008
2005/0011109 A1 * 1/2005 Valentyne .............. A01K 93/00 43/89
2009/0188151 A1 7/2009 Bartholomew
2011/0283596 A1 * 11/2011 Robinson ............... A01K 93/00 43/44.87
2013/0326932 A1 * 12/2013 Lee ........................ A01K 97/06 43/57.2

(Continued)

FOREIGN PATENT DOCUMENTS

CH 563105 A5 6/1975
DE 3438542 A1 4/1986

(Continued)

*Primary Examiner* — Maria E Graber
(74) *Attorney, Agent, or Firm* — Manatt, Phelps & Phillips, LLP

(57) ABSTRACT

A fishing bobber/floating device snaps fits onto a fishing line while forming an airtight cavity to aid the buoyancy of the fishing bobber/floating device. The fishing bobber/floating device may have a first hollow hemisphere and a second hollow hemisphere connected to each other by a living hinge. The fishing bobber/floating device may be used for fishing.

9 Claims, 8 Drawing Sheets

(56) References Cited

U.S. PATENT DOCUMENTS

| | | | | | |
|---|---|---|---|---|---|
| 2014/0190066 | A1* | 7/2014 | Bono | A01K 95/00 43/43.12 |
| 2022/0256828 | A1* | 8/2022 | Kuhns | A01K 91/08 |
| 2022/0312751 | A1* | 10/2022 | Mcgill | A01K 91/06 |

FOREIGN PATENT DOCUMENTS

| | | | |
|---|---|---|---|
| DE | 3522381 | A1 | 1/1987 |
| DE | 10033275 | A1 | 1/2002 |
| FR | 586204 | A | 3/1925 |
| FR | 1259964 | A | 5/1961 |
| GB | 716690 | A | 10/1954 |
| GB | 2155292 | A | 7/1988 |
| GB | 2232864 | A | 1/1991 |
| GB | 2305343 | A | 4/1999 |
| JP | 10327726 | A | 12/1998 |
| JP | 2000000039 | A | 1/2000 |
| JP | 2001204331 | A | 7/2001 |
| JP | 2004201670 | A | 7/2004 |
| SE | 52019 | | 6/1920 |
| WO | WO1993000802 | A1 | 1/1993 |
| WO | WO2002067672 | A1 | 9/2002 |
| WO | WO2004/032617 | A1 | 4/2004 |

* cited by examiner

FISHING BOB AND METHOD FOR USE

FIELD

The disclosure relates to a novel fishing bob and its method of use.

BACKGROUND

Fishing has existed for a very long time and during that time there are many different variations and designs for fishing bobs. A fishing bob is a device that floats on water while fishing and allows the angler to adjust a line of fishing line that extends into the water. A fishing bob ideally is simple to use, allows the length of the fishing line extending into the water to be easily adjusted and is watertight so that it can effectively flow on a surface of the water. Thus, it is desirable to provide such a fishing bob and method of use and it is to this end that the disclosure is directed.

DETAILED DESCRIPTION OF ONE OR MORE EMBODIMENTS

Figure 1:
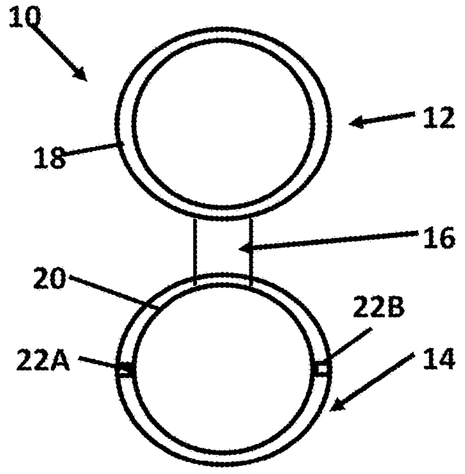
FIG. 1 is a top view of a novel fishing bob.

The disclosure is particularly applicable to a fishing bob with the shape and material shown in the drawings and it is in this context that the disclosure will be described. It will be appreciated, however, that the fishing bob may be made of different materials or may have a different shape that is within the scope of this disclosure.

Figure 2:
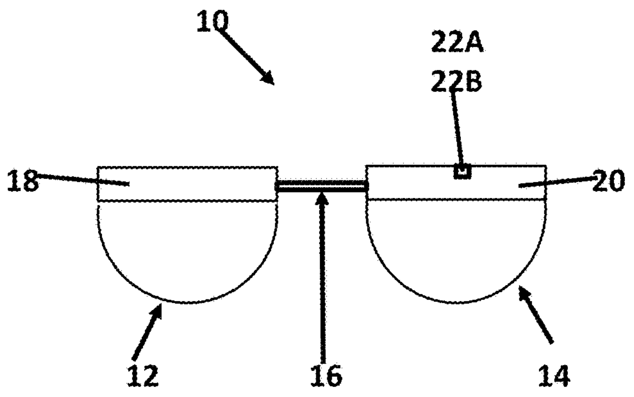
FIG. 2 is a side view of the novel fishing bob shown in FIG. 1.

FIGS. 1 and 2 are a top view and side view, respectively, of a novel fishing bob 10 that has a first and second hollow portions 12, 14 that may snap together to form an airtight fishing bob. The fishing bob 10 may have a living hinge 16 that connects the two portions 12, 14 to each other and is flexible and can bend when the two portions 12,14 are snapped together to form the airtight compartment so that the fishing bob floats on the surface of the water. In one embodiment, each portion 12, 14 may be a semi-circular sphere (each portion being a hemisphere) that, when snapped together forms a hollow airtight sphere. The inside of each portion 12, 14 is hollow. In one embodiment, the portions 12, 14 and the living hinge 16 may be made of a flexible plastic material. Each portion 12, 14 may be lightweight so that the fishing bob 10 is lightweight. For example, the plastic material used in the construction of the fishing bob may be selected from a group consisting of polyethylene, polypropylene, or similar lightweight, resilient, and waterproof plastics. When the fishing bob is snapped shut, the air trapped in each portion 12, 14 in the airtight compartment provide buoyancy for the fishing bob 10.

The first portion 12 may have a male ridge 18 around the circumference of the first portion 12 and the second portion 14 may have a female ridge 20 around the circumference of the second portion 14 wherein the male and female ridges 18, 20 may snap together to form the airtight fishing bob. Each surface of the ridge may frictionally fit against the other surface of the ridge. One ridge may have a detent and may have a detent and the other ridge may have a valley into which the detent snaps and remains until the fishing bob is opened.

In the embodiment shown in FIG. 1-5, the male ridge has a shape and a feature wherein the feature of the male ridge extends away from the first portion while the female ridge has a shape and a feature wherein the feature is below a top surface of the second portion 14. When the fishing bobber/flotation device 10 is closed, the male ridge feature slides inside of the female ridge and interacts to snap close the fishing bobber/flotation device 10.

One of the first or second portions 12, 14 (shown as part of the second portion 14 in the example in FIG. 1) may have a valley region 22A, 22B along a top of the ridge into which a fishing line may be placed in order to position the fishing bob on the fishing line. The valley region 22A, 22B (also known as a groove) may be sized and have a shape such that the fishing line fits snugly in the valley region (so that the fishing bob is airtight), but allows the fishing line to be slid through the valley region to adjust the position of the fishing bob on the fishing line. In some embodiments, the line traverses across the fishing bobber 10 perpendicular to the living hinge 16 as shown in FIG. 1. In most embodiments, when the first and second portions 12, 14 are snapped together, one of the portions presses down on the fishing line in the valley region so that there is friction preventing the fishing line from easily sliding. However, the friction can be easily overcome by a user who wants to adjust the position of the fishing bob along the fishing line. In the first embodiment, the line is held by the sides of the fishing bob when closed that trap the fishing line. In the second embodiment shown in FIGS. 6-10 with the risers 110A, 110B, the fishing line is held in place by a valley region 114 of each riser when the fishing bob is open and then held by the sides of the fishing bob when closed that trap the fishing line.

Figure 3:
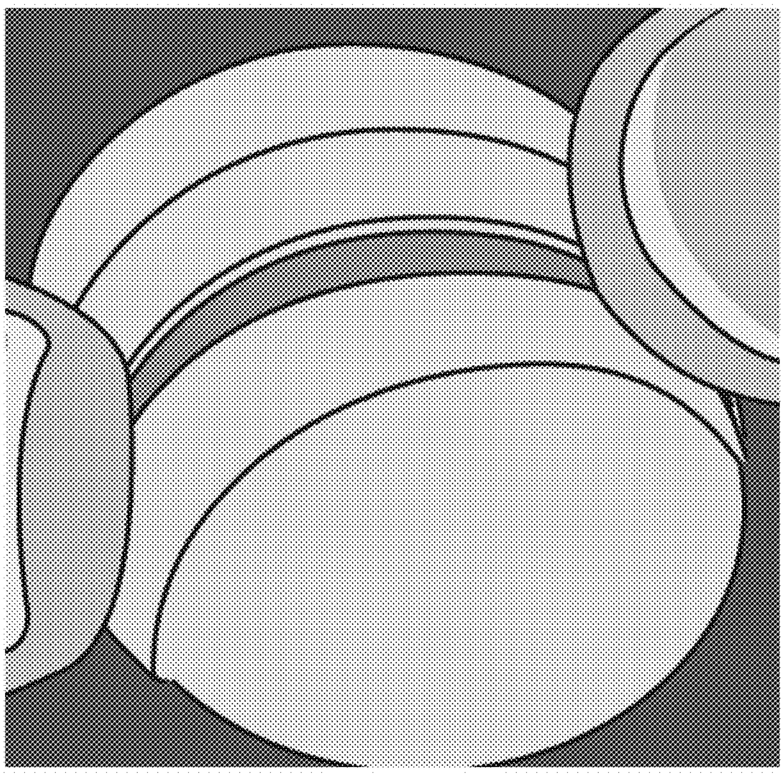
FIG. 3 illustrates a technique to open the novel fishing bob.
Figure 4:
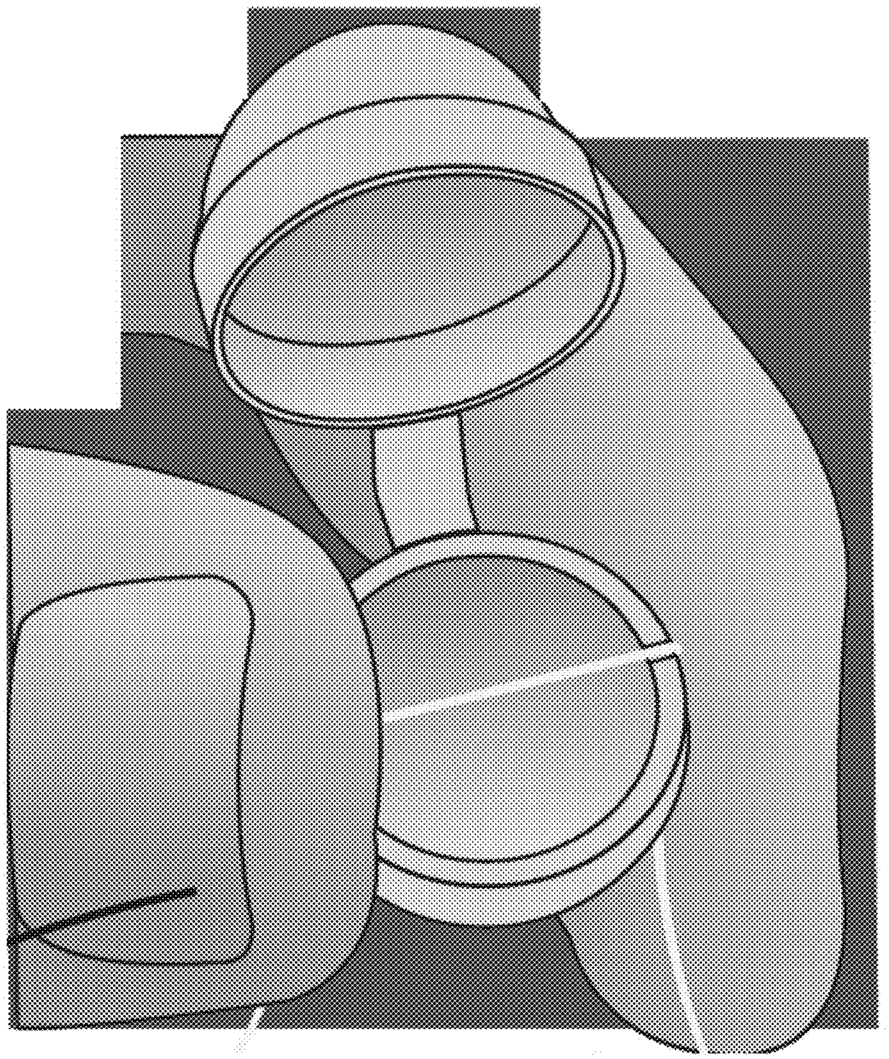
FIG. 4 illustrates a technique to insert a fishing line into the novel fishing bob.
Figure 5:
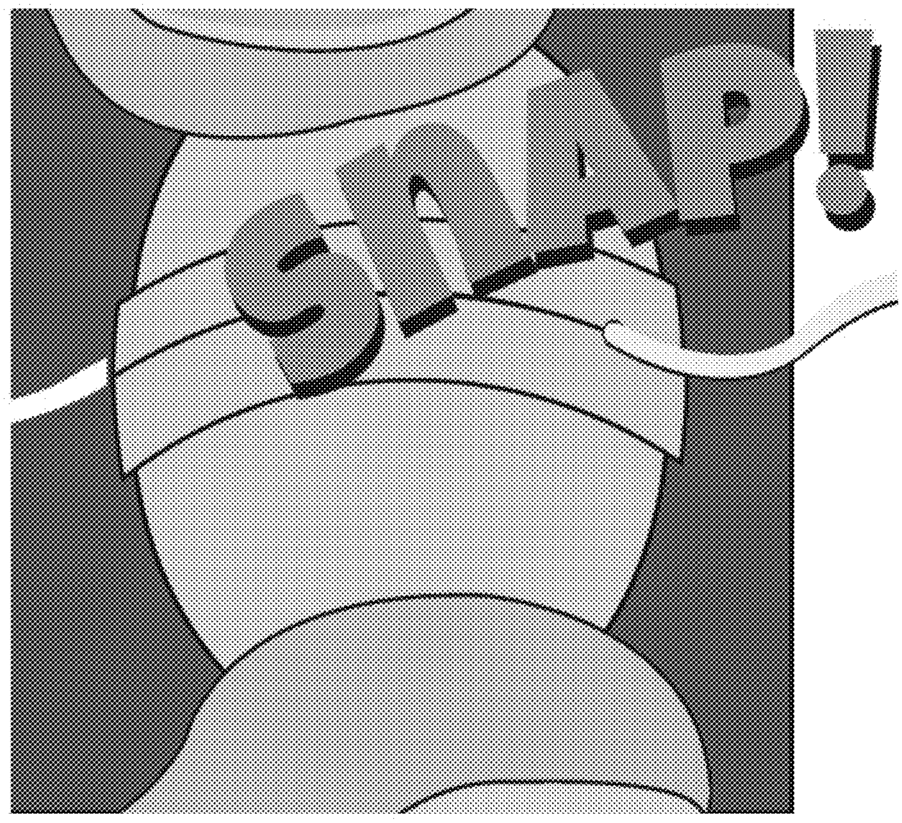
FIG. 5 illustrates a technique to close the fishing bob once the fishing line is placed in the fishing bob.

FIG. 3 illustrates a technique to open the novel fishing bob. As shown in FIG. 3, when the fishing bob is closed (the first and second portions 12, 14 are snap fitted together), a user may squeeze a center line (at ridges 18, 20) that will cause the first and second portions 12, 14 to unsnap from each other and the fishing bob to open. In order to insert a fishing line into the fishing bob, a user, as shown in FIG. 4, may hold the fishing line in the groove/valley regions 22A, 22B on each side of the open fishing bob with his/her fingers. As shown in FIG. 5, the user may then push, with the fishing line still in the groove, the two portions 12,14 towards each other so that the male and female ridges 18, 20 snap together forming the airtight cavity inside of the fishing bob. As mentioned above, although the snapping of the first and second portions 12, 14 together presses the fishing line into a bottom of the groove 22A, 22B so that the fishing bob does not slide on its own along the fishing line, a user can still slide the fishing line through the fishing bob to adjust the position of the fishing bob along the line.

Figure 6:
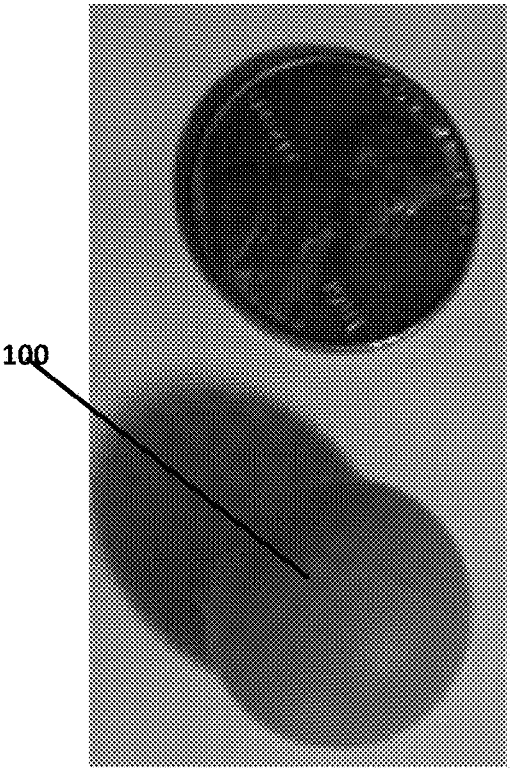
FIG. 6 is a closed second embodiment of the fishing bob.

The fishing bobber and flotation device may be generally spherical when closed and may be lightweight, resilient, and waterproof plastic material. The plastic material of the fishing bobber may be selected from a group consisting of polyethylene, polypropylene or similar lightweight, resilient, and waterproof plastics. The fishing bobber/floatation device shown in FIGS. 1-5 above may have varying diameters from several millimeters to 2 inches or more in diameter to accommodate different fishing conditions and preferences. For example, the example of the second embodiment of the fishing bob has a similar diameter to a penny as shown in FIG. 6.

In one embodiment, the fishing bobber may have two hemispheres (which are hollow to capture air to aid in the buoyancy of the fishing bobber) with a living hinge connecting them together. The living hinge allows a user to manipulate the hemispheres to open and close the fishing bobber without the need for tools and firmly securing the fishing line in place without leaking. A male and female ridge on the respective hemispheres 12, 14 of the floatation device 10 facilitates easy alignment when closing the fishing bobber 10 and secure closure, while also permitting opening through a slight squeezing motion between one's thumb and fingers as discussed above. The living hinge 16 enables the two hemispheres 12, 14 to be aligned together to form an airtight sphere thereby creating floatation qualities suitable for fishing applications. The fisher bobber may be made using lightweight construction that allows for easy casting during fishing activities. In some embodiments, the fishing bob may have a weight added.

The fishing bobber/floatation device 10 may have markings or color variations on an outer surface of each hemisphere (or on an outer surface of at least one hemisphere) for enhanced visibility during fishing. The fishing bobber/floatation device 10 may have a central attachment point on the floatation device for securing fishing lines or other accessories. The living hinge is engineered to withstand repeated opening and closing without compromising its structural integrity.

In a method of use, the fishing bobber/floatation device 10 may be attached to a fishing line and securely closed. The fishing line with the closed fishing bobber/floatation device 10 may be cast into a body of water. The fisherman may observe the floatation device 10 for indications of fish activity based on its movement or positioning in the water. The user may then remove the fishing bobber/floatation device 10 from the fishing line as needed or reposition it for subsequent casting.

Figure 7:
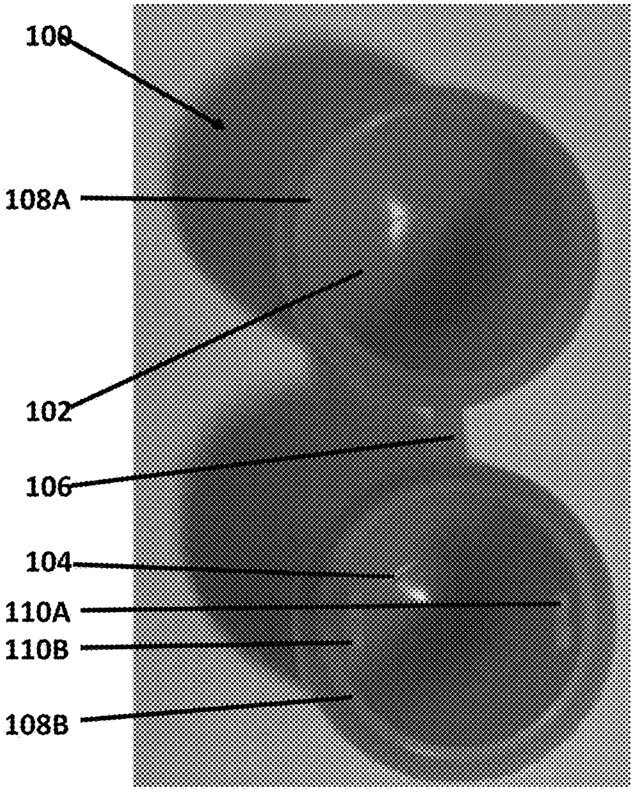
FIG. 7 shows an open position showing the front surface of the second embodiment of the fishing bob.
Figure 8:
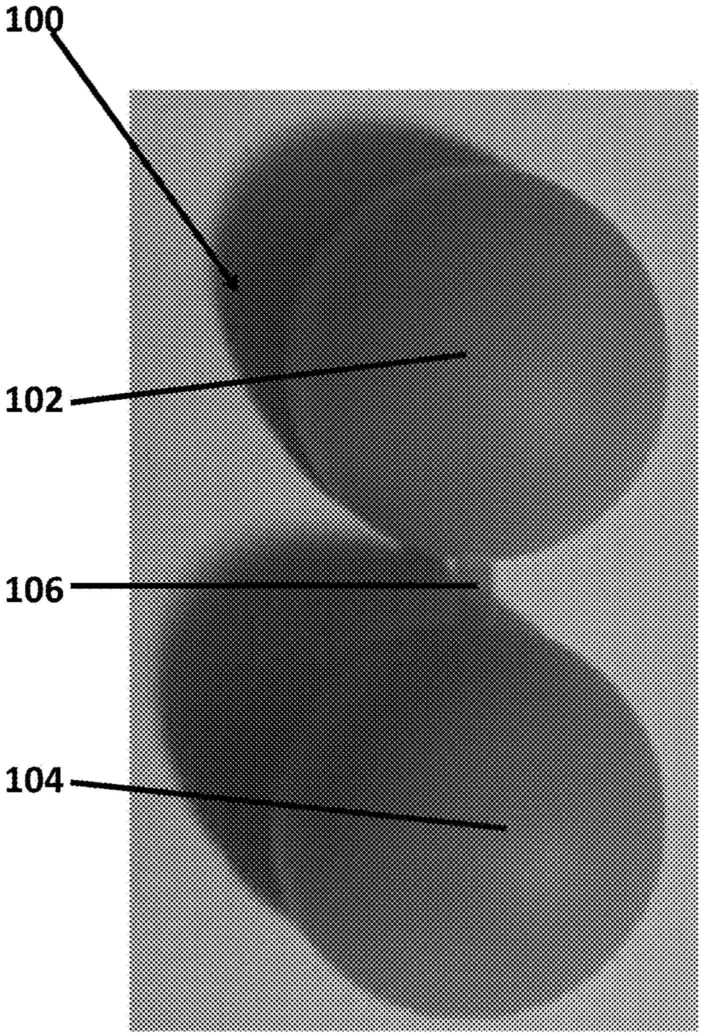
FIG. 8 illustrates an open position showing the back surface of the second embodiment of the fishing bob.

FIG. 6 is a closed second embodiment of a fishing bob 100. Like the first embodiment, the second embodiment may be approximately the size, when closed, of a penny as shown in FIG. 6. As shown in FIG. 7 and FIG. 8, the second embodiment of the fishing bob 100 may have a first semicircular portion 102 and a second semicircular portion that are connected by a living hinge 106 so that the two portions 102, 104 may be snapped together as described below. Like the first embodiment, the second embodiment may be made of a waterproof plastic material such as polyethylene or polypropylene that is also flexible enough to allow the hinge 106 to bend as the two portions 102, 104 are closed. Each of the two portions 102, 104 may have an element 108A, 108B that cooperate with each other when the fishing bob 100 is closed to form a watertight fit (keeping the water out so that the bob 100 floats when thrown in the water) and to create a friction fit that keeps the bob 100 closed until a user pries it open.

As shown in FIG. 7, the second embodiment may have a first riser 110A and a second riser 110B at a smaller diameter than the element 108B into which a fishing line may be placed before the fishing bob 100 is shut. Each riser 110A, 100B may be formed inside of the second portion 104 during an injection molding process. In some embodiments, each riser 110A, 110B may be opposite each other along a diameter through the center of the fishing bob. The risers 110A, 100B hold the fishing line in place while the fishing bob 100 is closed so that the fishing bob maintains its position on the fishing line during closure. Once the fishing bob 100 is closed, a wall of the two portions 102, 104 and the elements 108A, 108B compress the fishing line and hold the fishing bob 100 on the fishing line at the location it was attached to the fishing line.

The valley regions 22A, 22B in the first embodiment and the risers 110A, 100B in the second embodiment may each be known as a line retainer. Each pair of valley regions in the first embodiment or the pair of risers in the second embodiment may be collectively known as a line retainer pair.

Figure 9:
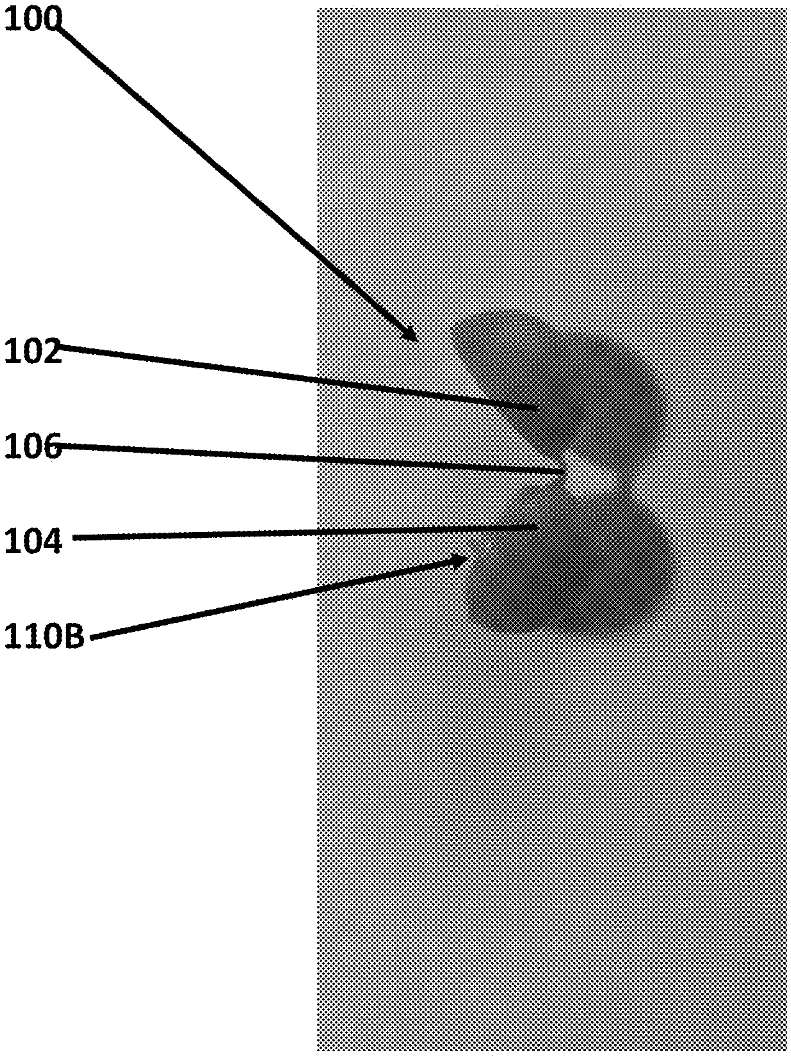
FIG. 9 is a side view of the second embodiment of the fishing bob.
Figure 10:
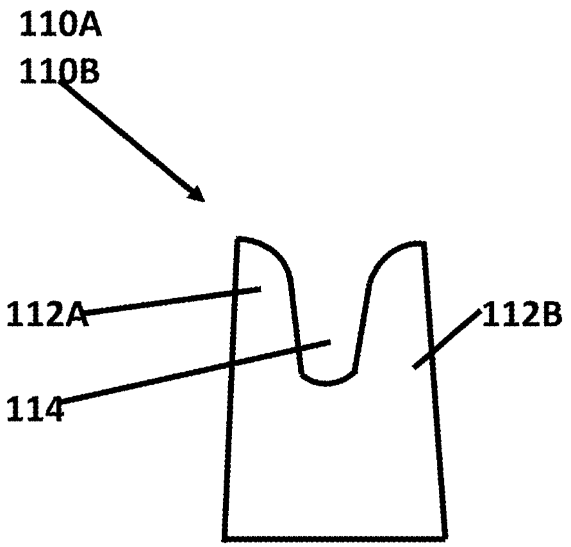
FIG. 10 illustrates more details of each riser.

FIG. 9 is a side view of the second embodiment of the fishing bob 100 and FIG. 10 shows more details of each riser 110A, 110B. In one embodiment, each riser 110A, 100B may have the shape shown in FIG. 10. Each riser may have a first leg and a second leg 112A, 112B and a valley region 114 between the leg portions. The diameter of the curve at the bottom of the valley region 114 and a width, w, between the walls of the leg 112A, 112B may be less than the width of a typical fishing line such that the fishing line is frictionally held by the valley region 114.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A device, comprising:

a first hollow hemisphere having a male ridge around an outer edge of the first hollow hemisphere;

a second hollow hemisphere connected to the first hollow hemisphere by a living hinge, the second hollow hemisphere having a female ridge around an outer edge of the second hollow hemisphere that snaps together with the male ridge when the device is closed;

a first line retainer formed in the first hollow hemisphere at a diameter less than the diameter of the male ridge;

a second line retainer formed in the first hollow hemisphere at a diameter less than the diameter of the male ridge;

each line retainer having a bottom with two legs and a valley region with a diameter of a curve and a width between the two legs at a bottom of the valley region less than the width of a fishing line to frictionally hold the fishing line at a diameter less than the diameter of the male ridge; and wherein the first and second hollow hemispheres snap together to trap air in the first and second hollow hemispheres to create an airtight internal area of the device that provide buoyancy to the device and to secure the device with the airtight internal area to the fishing line at the diameter of the male ridge.

2. The device of claim 1, wherein the male ridge presses the fishing line to secure the device with the airtight internal area to the fishing line.

3. The device of claim 1, wherein the device is made of a waterproof plastic material.

4. The device of claim 3, wherein the waterproof plastic material is one of polyethylene and polypropylene.

5. The device of claim 1, wherein an outer surface of one of the first and second hollow hemispheres has a visibility indicator.

6. A method, comprising:

positioning, in a position along a fishing line, a fishing bobber, the fishing bobber having a first hollow hemisphere and a second hollow hemisphere connected to each other by a living hinge;

snapping a male ridge and a female ridge of the first and second hollow hemispheres together to trap air in the first and second hollow hemispheres to provide buoyancy to the fishing bobber and secure the fishing bobber to the position on the fishing line to form an airtight internal area and secure the fishing bobber to the fishing line at the diameter of the male ridge; and wherein securing the fishing bobber to the fishing line further comprises frictionally holding the fishing line at a diameter less than the diameter of the male ridge with a first line retainer formed in the first hollow hemisphere at the diameter less than the diameter of the male ridge and a second line retainer formed in the first hollow hemisphere at the diameter less than the diameter of the male ridge by a valley region in each first and second line retainer that has a diameter of a curve and a width at a bottom of the valley region less than the width of a fishing line.

7. The method of claim 6 further comprising observing, based on movement of the fishing bobber in a body of water, fish activity.

8. The method of claim 6 further comprising releasing the fishing bobber from the fishing line.

9. The method of claim 8, wherein releasing the fishing bobber further comprises squeezing the male ridge and female ridge to separate the first hollow hemisphere and the second hollow hemisphere.

* * * * *